(12) United States Patent
Nagata et al.

(10) Patent No.: US 12,128,782 B2
(45) Date of Patent: Oct. 29, 2024

(54) INFORMATION PROCESSING APPARATUS, INFORMATION PROCESSING SYSTEM, PROGRAM AND VEHICLE

(71) Applicant: TOYOTA JIDOSHA KABUSHIKI KAISHA, Aichi-ken (JP)

(72) Inventors: Yu Nagata, Chofu (JP); Kazutaka Kimura, Mishima (JP); Tomokazu Maya, Nagoya (JP); Tsuyoshi Nishioka, Toyota (JP); Takaharu Tateishi, Nagoya (JP); Yuki Yamashita, Tokyo (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 356 days.

(21) Appl. No.: 17/826,175

(22) Filed: May 27, 2022

(65) Prior Publication Data

US 2022/0410748 A1    Dec. 29, 2022

(30) Foreign Application Priority Data

Jun. 23, 2021  (JP) ................................. 2021-104470

(51) Int. Cl.
| | |
|---|---|
| *B60L 53/60* | (2019.01) |
| *B60L 58/10* | (2019.01) |
| *G06Q 10/02* | (2012.01) |
| *G06Q 30/0207* | (2023.01) |

(52) U.S. Cl.
CPC ............. *B60L 53/60* (2019.02); *B60L 58/10* (2019.02); *G06Q 10/02* (2013.01); *G06Q 30/0209* (2013.01)

(58) Field of Classification Search
CPC ........... B60L 3/60; B60L 58/10; G06Q 10/02; G06Q 30/0209
USPC .......................................................... 701/22
See application file for complete search history.

(56) References Cited

U.S. PATENT DOCUMENTS

| | | | |
|---|---|---|---|
| 11,315,199 B2* | 4/2022 | Uyeki | B60L 53/68 |
| 2013/0057211 A1* | 3/2013 | Kuribayashi | B60L 53/63 |
| | | | 320/109 |
| 2022/0016995 A1* | 1/2022 | Vismara | B60L 53/63 |
| 2022/0085626 A1* | 3/2022 | Singh | H02J 7/0048 |

FOREIGN PATENT DOCUMENTS

WO    2013031036 A1    3/2013

* cited by examiner

*Primary Examiner* — Yazan A Soofi
(74) *Attorney, Agent, or Firm* — HAUPTMAN HAM, LLP

(57) ABSTRACT

An information processing apparatus includes a control section. The control section predicts an amount of electricity demanded for charging of vehicles that a plurality of users use, respectively, and determines a time slot in which the amount of electricity demanded exceeds a threshold value, and when the control section determines that one user of the plurality of users will refrain from use of the relevant vehicle on the following day, makes charging of the one user's vehicle wait in the time slot and provides an incentive to the one user.

20 Claims, 7 Drawing Sheets

FIG. 7

| TIME SLOT | USER | VEHICLE | SCHEDULE | TRANSPORTATION MEANS | INCENTIVE |
|---|---|---|---|---|---|
| 22:00 TO 23:00 | A | V1 | OFF | WALKING | NUMBER OF STEPS IN WALKING GAME |
| | B | V2 | TRAVEL TO WORK | BIKING | POINTS IN CYCLING GAME |
| | C | V3 | TRAVEL TO WORK | PUBLIC TRANSPORTATION | POINTS USABLE IN PUBLIC TRANSPORTATION |
| | D | V4 | BUSINESS TRIP | TAXI | TAXI TICKET |

INFORMATION PROCESSING APPARATUS, INFORMATION PROCESSING SYSTEM, PROGRAM AND VEHICLE

CROSS-REFERENCE TO RELATED APPLICATION

This application claims priority to Japanese Patent Application No. 2021-104470 filed on Jun. 23, 2021, incorporated herein by reference in its entirety.

BACKGROUND

1. Technical Field

The present disclosure relates to an information processing apparatus, an information processing system, a program and a vehicle.

2. Description of Related Art

Conventionally, techniques related to charging of vehicles including, e.g., battery electric vehicles (BEVs) have been known. For example, WO2013/031036 discloses a charging control system in which if charging of a vehicle meets a predetermined condition, the vehicle is charged with electricity from a stationary energy storage and if charging of a vehicle does not meet the condition, the vehicle is charged with electricity from an electricity distribution grid.

SUMMARY

However, in the conventional techniques, charging of vehicles when an amount of electricity demanded in an entire community which a plurality of users belong to increases has not been sufficiently considered.

The present disclosure provides a technique that enables curbing an excessive increase in amount of electricity demanded in an entire community.

An information processing apparatus according to an embodiment of the present disclosure includes a control section. The control section predicts an amount of electricity demanded for charging of vehicles that a plurality of users use, respectively, and determines a time slot in which the amount of electricity demanded exceeds a threshold value, and when the control section determines that one user of the plurality of users will refrain from use of the relevant vehicle on the following day, makes charging of the one user's vehicle wait in the time slot and provides an incentive to the one user.

A program according to an embodiment of the present disclosure makes an information processing apparatus perform an operation including: predicting an amount of electricity demanded for charging of vehicles that a plurality of users use, respectively; determining a time slot in which the amount of electricity demanded exceeds a threshold value; determining whether or not one user of the plurality of users will refrain from use of the relevant vehicle on the following day; and when it is determined that one user of the plurality of users will refrain from use of the relevant vehicle on the following day, making charging of the one user's vehicle wait in the time slot and providing an incentive to the one user.

A vehicle according to an embodiment of the present disclosure includes a control section. The control section predicts an amount of electricity demanded for charging of the vehicles that a plurality of users use, respectively, and determines a time slot in which the amount of electricity demanded exceeds a threshold value, and when the control section determines that one user of the plurality of users will refrain from use of the relevant vehicle on the following day, makes charging of the one user's vehicle wait in the time slot and provides an incentive to the one user.

The information processing apparatus, the information processing system, the program and the vehicle according to an embodiment of the present disclosure enable curbing an excessive increase in amount of electricity demanded in an entire community.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 7 is a diagram for illustratively describing processing executed by the information processing apparatus in FIG. 1.

DETAILED DESCRIPTION OF EMBODIMENTS

An embodiment of the present disclosure will be described with reference to the drawings.

Figure 1:
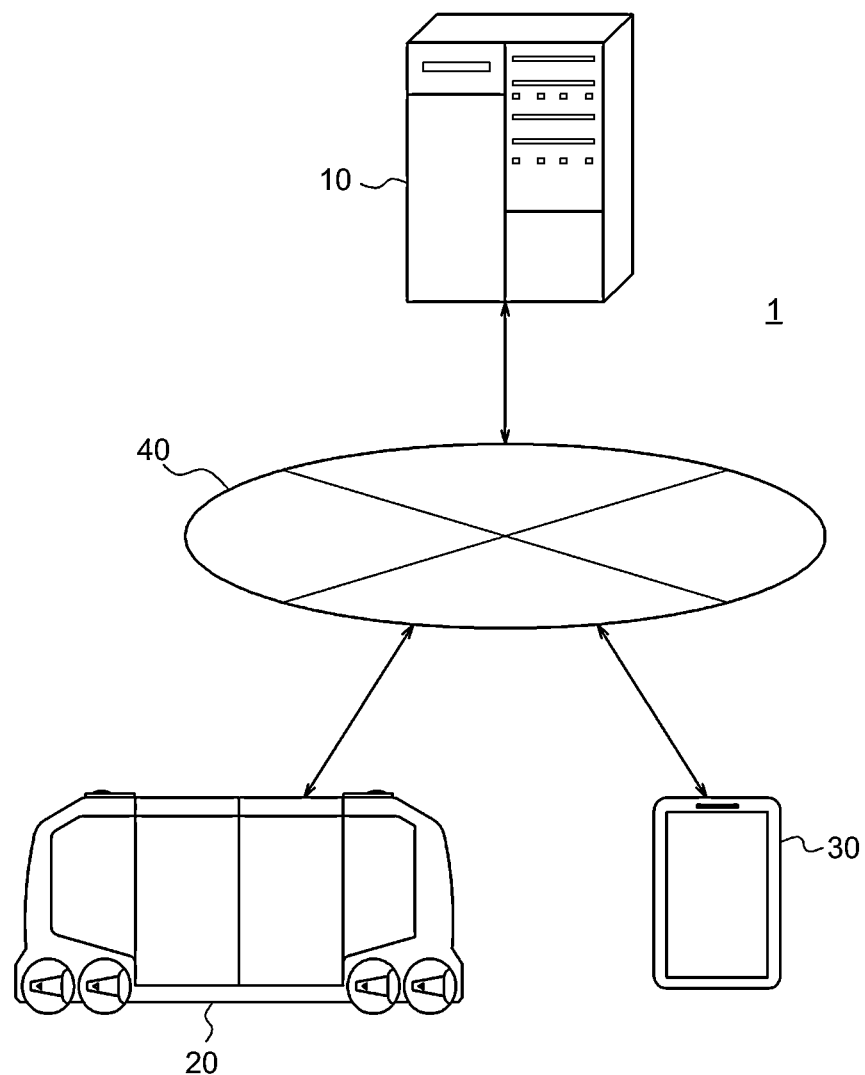
FIG. 1 is a configuration diagram illustrating a configuration of an information processing system including an information processing apparatus according to an embodiment of the present disclosure.

FIG. 1 is a configuration diagram illustrating a configuration of an information processing system 1 including an information processing apparatus 10 according to an embodiment of the present disclosure. An overview of the information processing system 1 including the information processing apparatus 10 according to an embodiment of the present disclosure will mainly be described with reference to FIG. 1. The information processing system 1 includes vehicles 20 and terminal devices 30 in addition to the information processing apparatus 10.

In FIG. 1, for simplicity of description, only one information processing apparatus 10 is illustrated; however, the information processing system 1 may include two or more information processing apparatuses 10. In FIG. 1, for simplicity of description, only one vehicle 20 and one terminal device 30 are illustrated; however, the information processing system 1 includes two or more vehicles 20 and two or more terminal devices 30. The information processing apparatus 10, the vehicles 20 and the terminal devices 30 are each communicably connected to a network 40, which includes, for example, a mobile communication network and the Internet.

The information processing apparatus 10 is one server apparatus or any of a plurality of server apparatuses that are mutually communicable. The information processing apparatus 10 is not limited to these examples and may be an arbitrary general-purpose electronic device such as a personal computer (PC) or a smartphone or another electronic device dedicated for the information processing system 1.

Each vehicle 20 is, for example, a battery electric vehicle. Each vehicle 20 is, for example, a vehicle that operates autonomously. Autonomous operation includes, for example, Levels 1 to 5 defined in Society of Automotive Engineers (SAE), but is not limited to these levels and may arbitrarily be defined. Each vehicle 20 is not limited to a vehicle that operates autonomously but may be an arbitrary vehicle operated by a driver.

Each terminal device 30 is, for example, a general-purpose electronic device such as a smartphone or a PC. Each terminal device 30 is, for example, an electronic device that a user of a relevant vehicle 20 uses. Each terminal device 30 is not limited to these examples and may be one server apparatus that a user of a relevant vehicle 20 uses or may be any of a plurality of server apparatuses that are mutually communicable or may be an electronic device dedicated for the information processing system 1.

As an overview of the embodiment, the information processing apparatus 10 predicts an amount of electricity demanded for charging of vehicles 20 that a plurality of users use, respectively. The information processing apparatus 10 determines a time slot in which the predicted amount of electricity demanded exceeds a threshold value. In the present description, examples of "threshold value" include an electricity value obtained by an upper limit value of an amount of supply of electricity that can be used for charging of the vehicles 20 being multiplied by a certain rate. Such threshold value is appropriately determined by, for example, a local government that manages a community which the plurality of users belong to and stored in the information processing apparatus 10 as information.

If one user of the plurality of users determines to refrain from use of the relevant vehicle 20 on the following day, the information processing apparatus 10 makes charging of the user's vehicle 20 wait in the time slot. Then, the information processing apparatus 10 provides an incentive to the user. In the present description, examples of "incentive" include, e.g., cash, coupons, credit card points, points that are usable on electric commerce (EC) sites, shopping applications or the like, points that are usable in games, points that are usable for public transportation and paper tickets such as taxi tickets.

Figure 2:
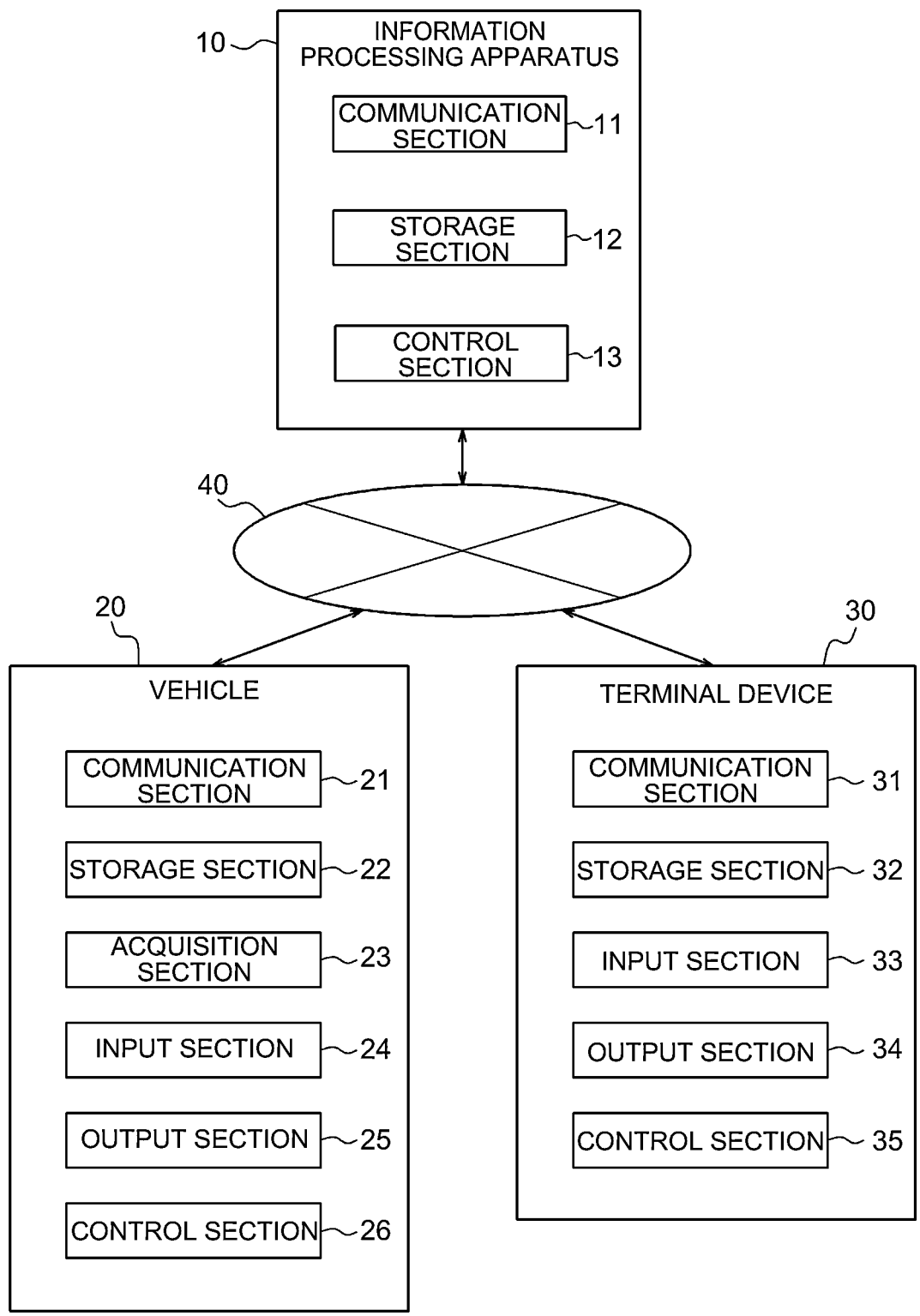
FIG. 2 is a functional block diagram illustrating respective schematic configurations of the information processing apparatus, the vehicle and the terminal device in FIG. 1.

FIG. 2 is a functional block diagram illustrating respective schematic configurations of the information processing apparatus 10, the vehicle 20 and the terminal device 30 in FIG. 1. Respective example configurations of the information processing apparatus 10, the vehicle 20 and the terminal device 30 included in the information processing system 1 will mainly be described with reference to FIG. 2.

As illustrated in FIG. 2, the information processing apparatus 10 includes a communication section 11, a storage section 12 and a control section 13.

The communication section 11 includes a communication module connected to the network 40. For example, the communication section 11 includes a communication module that complies with a mobile communication standard such as 4th Generation (4G) or 5th Generation (5G) or an Internet standard. In the embodiment, the information processing apparatus 10 is connected to the network 40 via the communication section 11. The communication section 11 transmits and receives various information pieces via the network 40.

Examples of the storage section 12 include, but are not limited to, a semiconductor memory, a magnetic memory and an optical memory. The storage section 12 functions, for example, as a main storage unit, an auxiliary storage unit or a cache memory. The storage section 12 stores arbitrary information used for operation of the information processing apparatus 10. For example, the storage section 12 stores, e.g., a system program, an application program, and various information pieces received or transmitted by the communication section 11. Information stored in the storage section 12 can be updated with, for example, information received from the network 40 via the communication section 11.

The control section 13 includes one or more processors. In the embodiment, "processor" is a general-purpose processor or a processor dedicated to particular processing, but is not limited to these examples. The control section 13 is communicably connected to respective component sections included in the information processing apparatus 10 and controls overall operation of the information processing apparatus 10.

A configuration of a vehicle 20 included in the information processing system 1 will mainly be described. As illustrated in FIG. 2, a vehicle 20 includes a communication section 21, a storage section 22, an acquisition section 23, an input section 24, an output section 25 and a control section 26. The communication section 21, the storage section 22, the acquisition section 23, the input section 24, the output section 25 and the control section 26 are mutually communicably connected via, for example, an in-vehicle network such as a Controller Area Network (CAN) or a dedicated wire in such a manner as to be mutually communicable.

The communication section 21 includes a communication module connected to the network 40. For example, the communication section 21 includes a communication module that complies with a mobile communication standard such as a 4G or 5G. In the embodiment, the vehicle 20 is connected to the network 40 via the communication section 21. The communication section 21 transmits and receives various information pieces via the network 40.

Examples of the storage section 22 include, but are not limited to, a semiconductor memory, a magnetic memory and an optical memory. The storage section 22 functions, for example, as a main storage unit, an auxiliary storage unit or a cache memory. The storage section 22 stores arbitrary information used for operation of the vehicle 20. For example, the storage section 22 stores a system program, an application program, and various information pieces received or transmitted by the communication section 21. Information stored in the storage section 22 can be updated with, for example, information received from the network 40 via the communication section 21.

The acquisition section 23 includes one or more receivers that are compatible with an arbitrary satellite positioning system. For example, the acquisition section 23 includes a global positioning system (GPS) receiver. The acquisition section 23 acquires a measurement value of a position of the vehicle 20 as position information. The position information includes, for example, an address, a latitude, a longitude and an altitude. The acquisition section 23 may acquire the position information of the vehicle 20 constantly, regularly or irregularly.

The input section 24 includes one or more input interfaces that, for example, receive a user's input operation inside a cabin of the vehicle 20 and acquire input information based on the user's input operation. For example, the input section 24 includes an input interface included in a car navigation device. For example, the input section 24 includes a touch screen provided integrally with a liquid-crystal monitor included in a car navigation device. The input section 24 receives, for example, the user's input operation, based on the user's touch operation.

The input section 24 is not limited to these examples and may include an arbitrary input interface capable of detecting the user's input operation and acquiring input information based on the user's input operation. The input section 24 may include, for example, a physical key, a capacitive key and a microphone that receives a voice input.

The output section 25 includes one or more output interfaces that, for example, output information to the user inside the cabin of the vehicle 20. For example, the output section 25 includes an output interface included in a car navigation device. For example, the output section 25 includes a liquid-crystal monitor included in a car navigation device. For example, the output section 25 outputs information in the form of at least one of an image and voice.

The output section 25 is not limited to these examples and may include an arbitrary output interface that affects at least one of visual perception and audio perception of the user of the vehicle 20. The output section 25 may include, for example, an arbitrary voice output interface other than a car navigation device, the audio output interface mainly affecting audio perception of the user of the vehicle 20. The output section 25 may include, for example, an arbitrary image output interface other than that of a car navigation device, the image output interface mainly affecting visual perception of the user of the vehicle 20.

The control section 26 includes one or more processors. In the embodiment, "processor" is a general-purpose processor or a processor dedicated to particular processing, but is not limited to these examples. For example, the control section 26 includes an electronic control unit (ECU). The control section 26 is communicably connected to respective component sections included in the vehicle 20 and controls overall operation of the vehicle 20.

A configuration of a terminal device 30 included in the information processing system 1 will mainly be described. As illustrated in FIG. 2, a terminal device 30 includes a communication section 31, a storage section 32, an input section 33, an output section 34 and a control section 35.

The communication section 31 includes a communication module connected to the network 40. For example, the communication section 31 includes a communication module that complies with a mobile communication standard such as 4G or 5G or an Internet standard. In the embodiment, the terminal device 30 is connected to the network 40 via the communication section 31. The communication section 31 transmits and receives various information pieces via the network 40.

Examples of the storage section 32 include, but are not limited to, a semiconductor memory, a magnetic memory and an optical memory. The storage section 32 functions, for example, as a main storage unit, an auxiliary storage unit or a cache memory. The storage section 32 stores arbitrary information used for operation of the terminal device 30. For example, the storage section 32 stores, e.g., a system program, an application program, and various information pieces received or transmitted by the communication section 31. Information stored in the storage section 32 can be updated with, for example, information received from the network 40 via the communication section 31.

The input section 33 includes one or more input interfaces that, for example, detect a user's input and acquire input information based on the user's operation. For example, the input section 33 includes, e.g., a physical key, a capacitive key, a touch screen provided integrally with a display of the output section 34, and a microphone that receives a voice input.

The output section 34 includes one or more output interfaces that output information to provide the information to the user. Examples of the output section 34 include, but are not limited to, a display that outputs information in the form of an image and a speaker that outputs information in the form of voice.

The control section 35 includes one or more processors. In the embodiment, "processor" is a general-purpose processor or a processor dedicated to particular processing, but is not limited to these examples. The control section 35 is communicably connected to respective component sections included in the terminal device 30 and controls overall operation of the terminal device 30.

Figure 3:
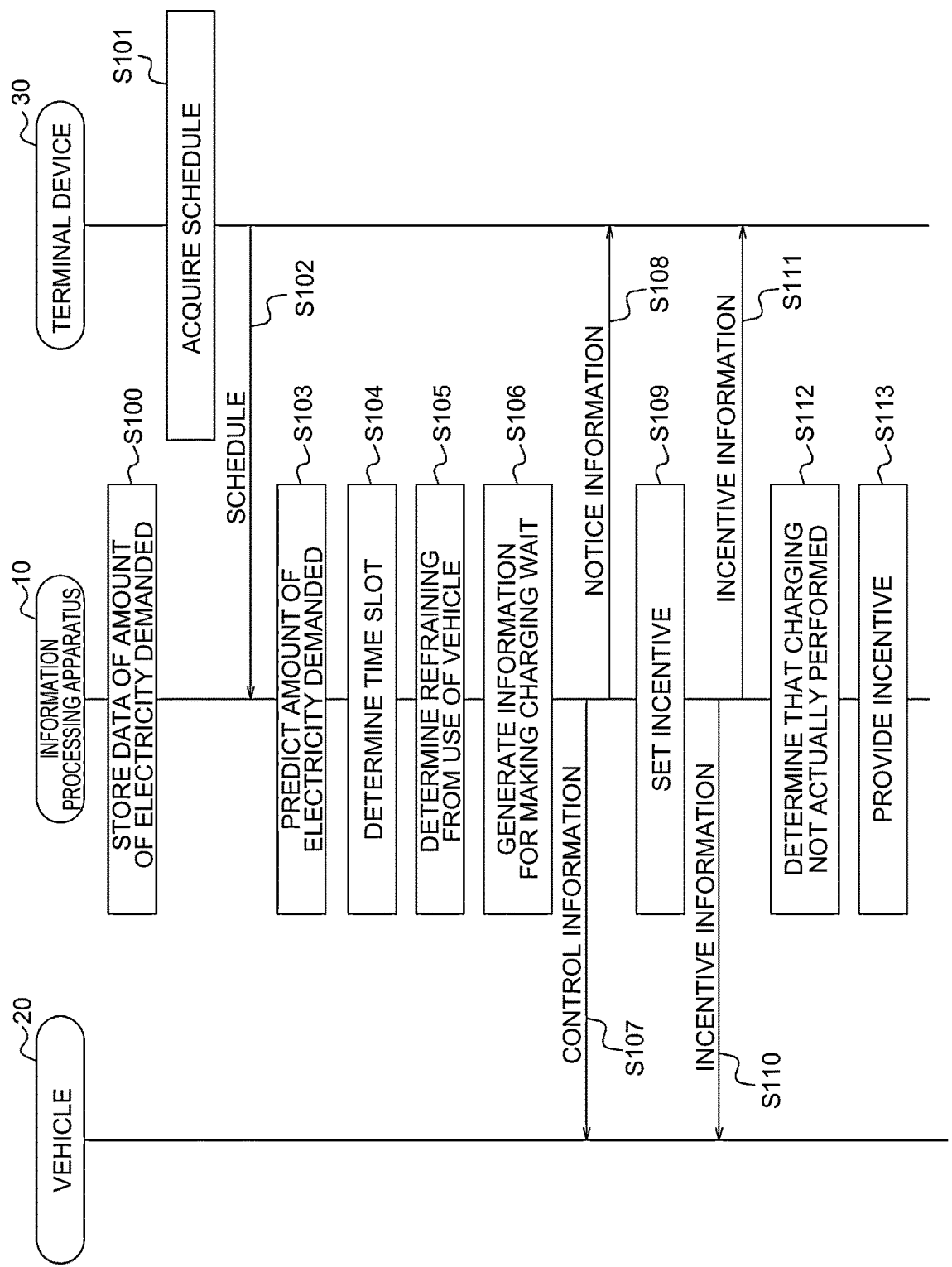
FIG. 3 is a sequence diagram for describing an example of an information processing method executed by the information processing system in FIG. 1.

FIG. 3 is a sequence diagram for describing an example of an information processing method executed by the information processing system 1 in FIG. 1. An example of an information processing method executed by the information processing system 1 in FIG. 1 will be described with reference to FIG. 3. The sequence diagram in FIG. 3 indicates a flow of basic processing in the information processing method executed by the information processing system 1.

In step S100, the control section 13 of the information processing apparatus 10 continuously acquires data of an amount of electricity demanded for charging of vehicles 20 that a plurality of users use, respectively, and stores the data in the storage section 12.

In step S101, the control section 35 of each terminal device 30 acquires the relevant user's schedule input by the user using the input section 33, as information.

In step S102, the control section 35 of each terminal device 30 transmits a content of the user's schedule acquired in step S101 to the information processing apparatus 10, as information, via the communication section 31 and the network 40. Consequently, the control section 13 of the information processing apparatus 10 acquires a plurality of schedules of a plurality of users from a plurality of terminal devices 30, respectively.

In step S103, the control section 13 of the information processing apparatus 10 predicts an amount of electricity demanded for charging of the vehicles 20 that the plurality of users use, respectively. For example, the control section 13 predicts an amount of electricity demanded for charging of the vehicles 20 that the plurality of users use, respectively, based on at least one of past data of an amount of electricity demanded, which has been stored in the storage section 12 in step S100, and the schedules of the plurality of the users, which has been acquired in step S102.

In step S104, the control section 13 of the information processing apparatus 10 determines a time slot in which the amount of electricity demanded, which has been predicted in step S103, exceeds a threshold value.

In step S105, the control section 13 of the information processing apparatus 10 determines that one user of the plurality of users will refrain from use of the vehicle 20 on the following day. For example, the control section 13 determines whether or not one user will refrain from use of the relevant vehicle 20 on the following day, based on the user's schedule for the following day, which has been acquired in step S102.

In step S106, if the control section 13 of the information processing apparatus 10 determines that the user will refrain from use of the vehicle 20 on the following day, the control section 13 generates information for making charging of the vehicle 20 of the user wait in the time slot determined in step S104. For example, the control section 13 generates information for controlling the vehicle 20 to prevent the vehicle 20 from being fed with electricity from an electricity grid in the time slot even if the vehicle 20 is connected to the electricity grid. For example, the control section 13 generates notice information for urging the user of the vehicle 20 not to connect the vehicle 20 to the electricity grid in the time slot.

In step S107, the control section 13 of the information processing apparatus 10 transmits the control information generated in step S106 to the vehicle 20 via the communication section 11 and the network 40. Consequently, the control section 26 of the vehicle 20 acquires the control information from the information processing apparatus 10. Based on the acquired control information, the control section 26 controls the vehicle 20 to prevent the vehicle 20 from being fed with electricity from the electricity grid in the time slot even if the vehicle 20 is connected to the electricity grid. For example, the control section 26 may electrically control the vehicle 20 to prevent the vehicle 20 from being supplied with electricity from the electricity grid with the vehicle 20 kept connected to the electricity grid. For example, the control section 26 may control the vehicle 20 to physically cancel the connection between the vehicle 20 and the electricity grid.

In step S108, the control section 13 of the information processing apparatus 10 transmits the notice information generated in step S106 to the terminal device 30 via the communication section 11 and the network 40. Consequently, the control section 35 of the terminal device 30 acquires the notice information from the information processing apparatus 10. Based on the acquired notice information, the control section 35 executes notification processing for urging the user of the vehicle 20 not to connect the vehicle 20 to the electricity grid in the time slot, for the user via the output section 34.

In step S109, the control section 13 of the information processing apparatus 10 sets an incentive to be provided to the user, for which the information for making charging of the vehicle 20 wait has been generated in step S106.

In step S110, the control section 13 of the information processing apparatus 10 transmits a content of the incentive set in step S109 to the vehicle 20 as information, via the communication section 11 and the network 40. Consequently, the control section 26 of the vehicle 20 acquires the incentive information from the information processing apparatus 10. Based on the acquired incentive information, the control section 26 outputs the content of the incentive set in step S109 to the user via the output section 25.

In step S111, the control section 13 of the information processing apparatus 10 transmits the content of the incentive set in step S109 to the terminal device 30 as information, via the communication section 11 and the network 40. Consequently, the control section 35 of the terminal device 30 acquires the incentive information from the information processing apparatus 10. Based on the acquired incentive information, the control section 35 outputs the content of the incentive set in step S109 to the user via the output section 34.

After the above processing sequence, the control section 13 of the information processing apparatus 10 makes charging of the user's vehicle 20 wait in the time slot determined in step S104 and provides the incentive to the user.

More specifically, in step S112, the control section 13 of the information processing apparatus 10 determines that charging of the user's vehicle 20 has not actually been performed in the time slot determined in step S104.

In step S113, the control section 13 of the information processing apparatus 10 provides the incentive set in step S109 to the user.

Figure 4:
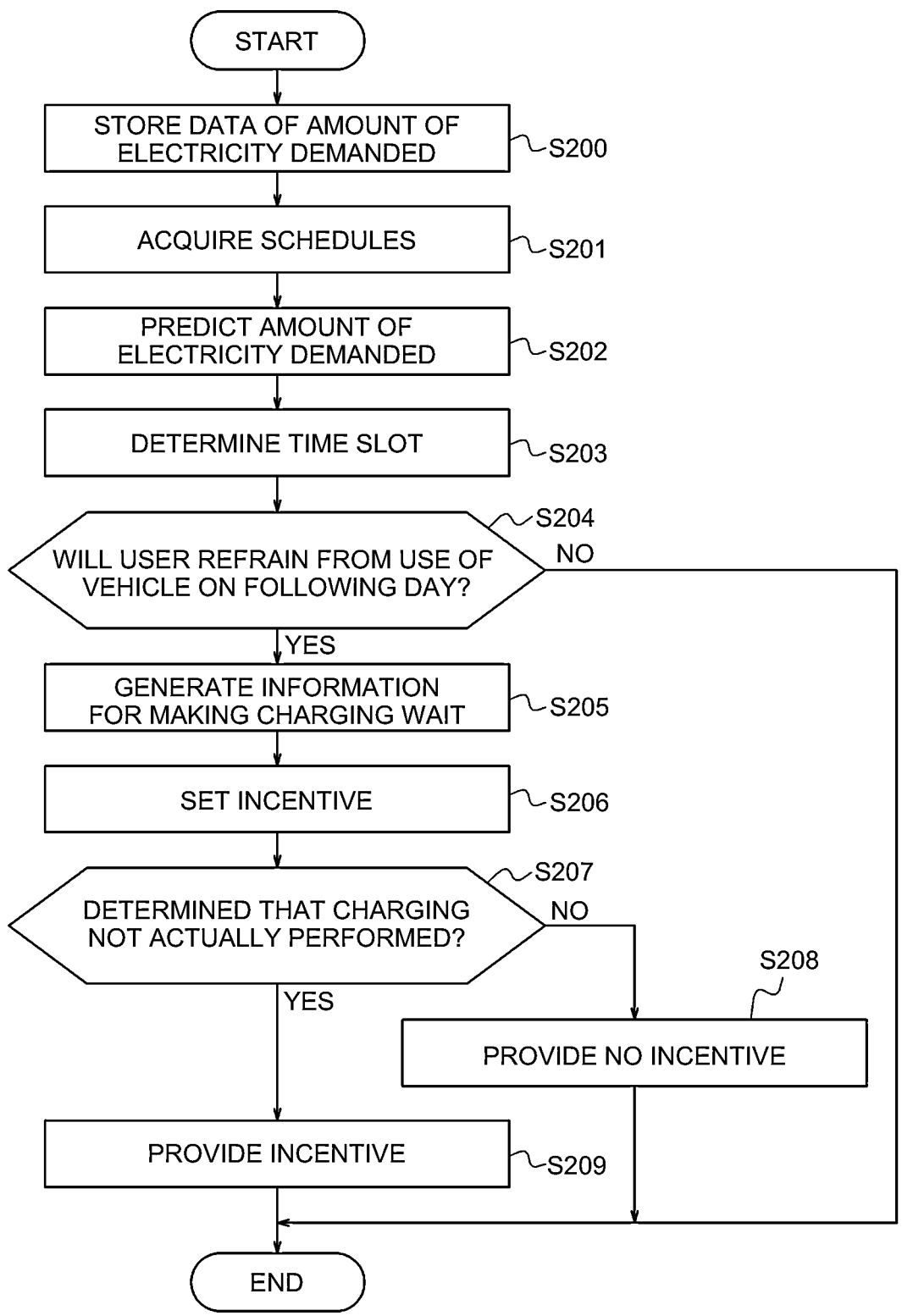
FIG. 4 is a flowchart for describing a first example of the information processing method executed by the information processing apparatus in FIG. 1.

FIG. 4 is a flowchart for describing a first example of the information processing method executed by the information processing apparatus 10 in FIG. 1. A first example of the information processing method executed by the information processing apparatus 10 in FIG. 1 will be described with reference to FIG. 4. The flowchart illustrated in FIG. 4 indicates a flow of basic processing in the information processing method executed by the information processing apparatus 10.

In step S200, the control section 13 continuously acquires data of an amount of electricity demanded for charging of vehicles 20 that a plurality of users use, respectively, and stores the data in the storage section 12.

In step S201, the control section 13 acquires schedules of a plurality of users from a plurality of terminal devices 30, respectively.

In step S202, the control section 13 predicts an amount of electricity demanded for charging of the vehicles 20 the plurality of users use, respectively. For example, the control section 13 predicts an amount of electricity demanded for charging of the vehicles 20 the plurality of users use, respectively, based on at least one of past data of the amount of electricity demanded, which has been stored in the storage section 12 in step S200, and the schedules of the plurality of the users, which have been acquired in step S201.

In step S203, the control section 13 determines a time slot in which the amount of electricity demanded, which has been predicted in step S202, exceeds a threshold value.

In step S204, the control section 13 determines whether or not one user of the plurality of users will refrain from use of the vehicle 20 on the following day. For example, the control section 13 determines whether or not one user will refrain from use of the vehicle 20 on the following day, based on the user's schedule for the following day, which has been acquired in step S201. If the control section 13 determines that the user will refrain from use of the vehicle 20 on the following day, the control section 13 executes the processing in step S205. If the control section 13 determines that the user will not refrain from use of the vehicle 20 on the following day, the control section 13 terminates the processing.

In step S205, if the control section 13 determines in step S204 that the user will refrain from use of the vehicle 20 on the following day, the control section 13 generates information for making charging of the user's vehicle 20 wait in the time slot determined in step S203. For example, the control section 13 generates information for controlling the vehicle 20 to prevent the vehicle 20 from being fed with electricity from an electricity grid in the time slot even if the vehicle 20 is connected to the electricity grid. For example, the control section 13 generates notice information for urging the user of the vehicle 20 not to connect the vehicle 20 to the electricity grid in the time slot.

The control section 13 transmits the control information generated in step S205 to the vehicle 20 via the communication section 11 and the network 40. The control section 13 transmits the notice information generated in step S205 to the terminal device 30 via the communication section 11 and the network 40.

In step S206, the control section 13 sets an incentive to be provided to the user for which the information for making charging of the vehicle 20 wait has been generated in step S205.

The control section 13 transmits a content of the incentive set in step S206 to the vehicle 20 as information, via the communication section 11 and the network 40. The control section 13 transmits the content of the incentive set in step S206 to the terminal device 30 as information, via the communication section 11 and the network 40.

After the above processing sequence, the control section 13 makes charging of the user's vehicle 20 wait in the time slot determined in step S203 and provides the incentive to the user.

More specifically, in step S207, the control section 13 determines whether or not charging of the user's vehicle 20 has not actually been performed in the time slot determined in step S203. If the control section 13 determines that the charging has not actually been performed, the control section 13 executes the processing in step S209. If the control section 13 determines that the charging has actually been performed, the control section 13 executes the processing in step S208.

In step S208, if the control section 13 determines in step S207 that the charging has actually been performed, the control section 13 does not provide the incentive set in step S206 to the user.

In step S209, if the control section 13 determines in the step S207 that the charging has not actually been performed, the control section 13 provides the incentive set in step S206 to the user.

Figure 5:
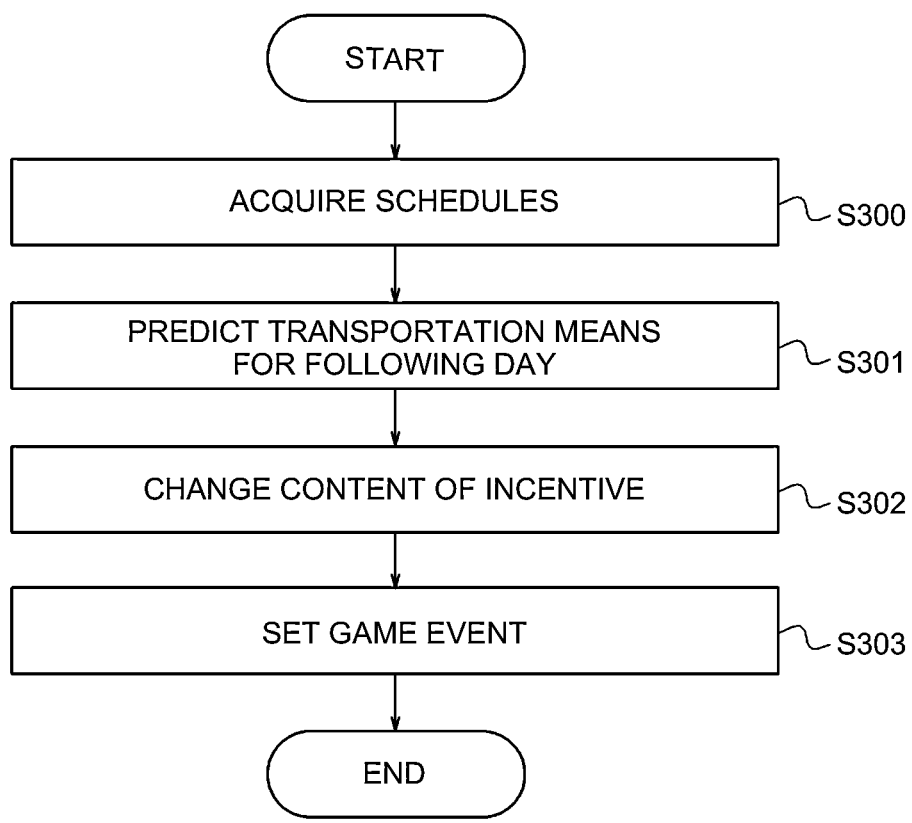
FIG. 5 is a flowchart for describing a second example of the information processing method executed by the information processing apparatus in FIG. 1.

FIG. 5 is a flowchart for describing a second example of the information processing method executed by the information processing apparatus 10 in FIG. 1. A second example of the information processing method executed by the information processing apparatus 10 in FIG. 1 will be described with reference to FIG. 5. The flowchart illustrated in FIG. 5 mainly indicates processing for setting an incentive in step S206 in FIG. 4 more specifically.

In step S300, the control section 13 acquires schedules of a plurality of users from a plurality of terminal devices 30, respectively.

In step S301, the control section 13 predicts one user's transportation means for the following day, which has been acquired in step S300, based on the user's schedule for the following day. In the present description, examples of "transportation means" include, e.g., walking, biking, public transportation such as a train, a bus and a taxi.

In step S302, the control section 13 changes a content of an incentive according to the user's transportation means for the following day, which has been predicted in step S301. For example, the control section 13 sets an incentive that is usable in a game related to the transportation means predicted in step S301.

In step S303, the control section 13 sets a game event related to the transportation means predicted in step S301, in addition to the above incentive setting processing. For example, if the control section 13 determines that the user will refrain from use of the vehicle 20 on the following day in step S204 in FIG. 4, the control section 13 executes such game event setting processing. The control section 13 transmits a content of the game event set in step S303 to the vehicle 20 as information, via the communication section 11 and the network 40. The control section 13 transmits the content of the game event set in step S303 to the terminal device 30 as information, via the communication section 11 and the network 40.

For example, if the transportation means is walking, the game event set by the control section 13 includes a game event to be beaten by a user walking through a predetermined area within a predetermined period of time. For example, if the transportation means is biking, the game event set by the control section 13 includes a game event to be beaten by a user biking through a predetermined area within a predetermined period of time. For example, if the transportation means is public transportation such as a train or a bus, the game event set by the control section 13 includes a particular game event that is generated only by a user moving to a particular spot such a train station or a bus stop. For example, if the transportation means is a taxi, the game event set by the control section 13 includes a particular game event that is generated only by a user moving to a particular spot such as a taxi stand.

Figure 6:
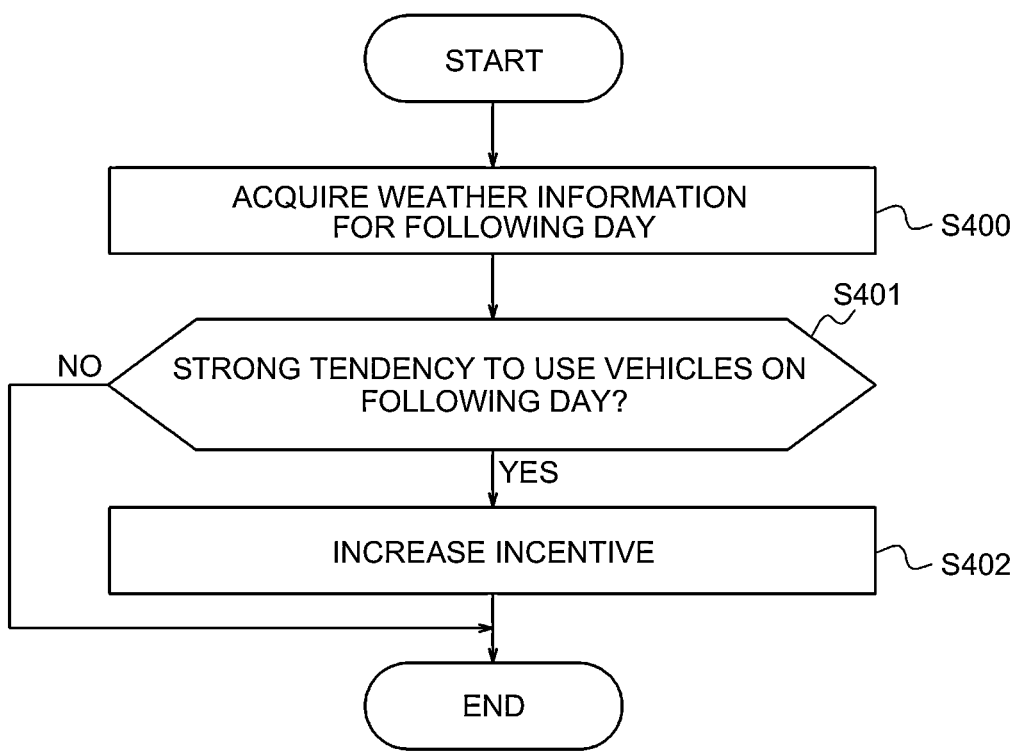
FIG. 6 is a flowchart for describing a third example of the information processing method executed by the information processing apparatus in FIG. 1.

FIG. 6 is a flowchart for describing a third example of the information processing method executed by the information processing apparatus 10 in FIG. 1. A third example of the information processing method executed by the information processing apparatus 10 in FIG. 1 will be described with reference to FIG. 6. The flowchart illustrated in FIG. 6 mainly indicates the incentive setting processing in step S206 in FIG. 4 more specifically.

In step S400, the control section 13 acquires, for example, weather information for the following day from an external server connected to the network 40 outside the information processing system 1.

In step S401, the control section 13 determines whether or not a plurality of users have a strong tendency to use respective vehicles 20 on the following day, based on the weather information acquired in step S400. If the control section 13 determines that the plurality of users have a strong tendency to use the respective vehicles 20 on the following day, the control section 13 executes the processing in step S402. If the control section 13 determines that the plurality of users have only a weak tendency to use the respective vehicles 20 on the following day, the control section 13 terminates the processing.

For example, if the control section 13 acquires information that it will be rainy on the following day as weather information in step S400, the control section 13 determines that the plurality of users have a strong tendency to use the respective vehicles 20 on the following day. For example, if the control section 13 acquires information that it will be fair and clear on the following day as weather information in step S400, the control section 13 determines that the plurality of users have only a weak tendency to use the respective vehicles 20 on the following day.

In step S402, if the control section 13 determines in step S401 that there is a strong tendency to use the vehicles 20 on the following day, the control section 13 increases an incentive to be provided to one user, for which information for making charging of the vehicle 20 wait have been generated.

FIG. 7 is a diagram for illustratively describing processing executed by the information processing apparatus 10 in FIG. 1. FIG. 7 mainly indicates the incentive setting processing in step S302 of FIG. 5 more specifically. In FIG. 7, the control section 13 determines, for example, a time slot of from 22:00 to 23:00 as a time slot in which an amount of electricity demanded for charging of vehicles 20 exceeds a threshold value. For one user to be provided with an incentive for making charging of the vehicle 20 wait in the time slot, the control section 13 changes a content of the incentive according to the user's transportation means for the following day. FIG. 7 indicates an example for four vehicles V1, V2, V3 and V4 that four users A, B, C and D use, respectively; however, the number of vehicles 20 included in the information processing system 1 is not limited to four.

For user A, the control section 13 acquires a following-day schedule of being off from work. The control section 13 predicts that user A's transportation means for the following day is not user A's vehicle V1 but walking only, based on the acquired following-day schedule of user A. In this case, the control section 13 sets a number of steps in a walking game, as an incentive to be provided to user A where user A makes charging of vehicle V1 wait in the time slot of from 22:00 to 23:00.

For user B, the control section 13 acquires a following-day schedule of travel time to work being extremely longer than that of a case where vehicle V2 is used. The control section 13 predicts that user B's transportation means for the following day is not user B's vehicle V2 but biking only, based on the acquired following-day schedule of user B. In this case, the control section 13 sets points that are usable in a cycling game, as an incentive to be provided to user B when user B makes charging of vehicle V2 wait in the time slot of from 22:00 to 23:00.

As above, the control section 13 sets an incentive that is usable in a game related to predicted transportation means.

For user C, the control section 13 acquires a following-day schedule of travel time to work being slightly longer than that of a case where vehicle V3 is used. The control section 13 predicts that user C's transportation means for the following day is not user C's vehicle V3 but public transportation such as a train and a bus only, based on the acquired following-day schedule of user C. In this case, the control section 13 sets points that are usable in public transportation, as an incentive to be provided to user C where user C makes charging of vehicle V3 wait in the time slot of from 22:00 to 23:00.

For user D, the control section 13 acquires a following-day schedule of not a travel to the user's office but a trip to a client located a relatively short distance from the user's office. The control section 13 predicts that user D's transportation means for the following day is not user D's vehicle V4 but a taxi only, based on the acquired following-day schedule of user D. In this case, the control section 13 sets a taxi ticket as an incentive to be provided to user D where user D makes charging of vehicle V4 wait in the time slot of 22:00 to 23:00. The control section 13 provides the incentive to user D by, for example, executing notification processing for providing notification to send a taxi ticket to user D, for a taxi company.

The above embodiment enables curbing an excessive increase in amount of electricity demanded in an entire community. For example, the information processing apparatus 10 enables curbing an electricity supply-demand balance tightening in a predetermined time slot by making charging of one user's vehicle 20 wait in the time slot. Consequently, the information processing apparatus 10 enables curbing a shortage of electricity in an entire community in the time slot. The information processing apparatus 10 provides an incentive to the user if the user has not actually performed charging of the vehicle 20 in the time slot, enabling enhancement in motivation of the user to avoid charging of the vehicle 20 in the time slot. Therefore, the user tries to actively uses the information processing system 1. As a result, the effect of curbing an electricity supply-demand balance tightening in the time slot is more reliably exerted, enabling enhancement in effectiveness of the information processing system 1.

The information processing apparatus 10 determines whether or not one user will refrain from use of a relevant vehicle 20 on the following day, based on the user' schedule for the following day, enabling enhancement in determination accuracy relating to such determination processing.

The information processing apparatus 10 changes a content of an incentive according to one user's transportation means for the following day, enabling setting an incentive tailored to transportation means the user actually uses. Consequently, the information processing apparatus 10 enables setting an elaborate incentive and thus enables enhancement of a user's interest in the incentive. As a result, it is possible to further enhance motivation of a user to avoid charging of a relevant vehicle 20 in a predetermined time slot.

The information processing apparatus 10 can set an incentive for a game tailored to transportation means one user actually uses, by setting an incentive that is usable in a game related to the transportation means. Consequently, the information processing apparatus 10 enables setting a more elaborate incentive and thus enables enhancement of a user's interest in the incentive. As a result, it is possible to further enhance motivation of a user to avoid charging of a relevant vehicle 20 in a predetermined time slot.

The information processing apparatus 10 can set a game event tailored to transportation means one user actually uses, by setting a game event related to the transportation means. Consequently, the information processing apparatus 10 enables setting an elaborate game event and thus enables enhancement of a user's interest in the game event. As a result, it is possible to further enhance motivation of a user to avoid charging of a relevant vehicle 20 in a predetermined time slot.

If the information processing apparatus 10 determines that a plurality of users have a strong tendency to use respective vehicles 20 on the following day, the information processing apparatus 10 increases an incentive. Consequently, the information processing apparatus 10 can urge a user to refrain from use of a relevant vehicle 20 on the following day even if such tendency is strong. A user can obtain a larger incentive, enabling enhancement in motivation to avoid charging of a relevant vehicle 20 in a predetermined time slot and refrain from use of the vehicle 20 on the following day. Therefore, a user tries to actively use the information processing system 1.

As a result, the effect of curbing an electricity supply-demand balance tightening in the time slot is more reliably exerted and effectiveness of the information processing system 1 is enhanced.

Although the present disclosure has been described based on the drawings and embodiment, it should be noted that a person skilled in the art can make various modifications and alterations based on the present disclosure. Therefore, it should be noted that these modifications and alterations are embraced within the scope of the present disclosure. For example, the functions and the like included in the components or the steps can be rearranged in such a manner as to cause no logical contradiction, and a plurality of components or steps or the like can be combined into one or can be each divided.

For example, at least a part of the processing operation executed in the information processing apparatus 10 in the above embodiment may be executed in a vehicle 20 or a terminal device 30. For example, instead of the information processing apparatus 10, a vehicle 20 itself may execute the processing operation relating to the information processing apparatus 10. At least a part of the processing operation executed in a vehicle 20 or a terminal device 30 may be executed in the information processing apparatus 10.

For example, a general-purpose electronic device such as a smartphone or a computer can be made to function as the information processing apparatus 10 according to the above-described embodiment. More specifically, a program in which processing contents for implementing the respective functions of the information processing apparatus 10, etc., according to the embodiment are described is stored in a memory of an electronic device and the program is read and executed by a processor of the electronic device. Therefore, the disclosure according to the embodiment can be implemented in the form of a program that can be executed by a processor.

Alternatively, the disclosure according to the embodiment can be implemented in the form of a non-transitory computer-readable medium on which a program that can be executed by one or more processors in order to make, e.g., the information processing apparatus 10 according to the embodiment implement the respective functions is stored. It should be understood that these program and medium are also embraced within the scope of the present disclosure.

For example, the information processing apparatus 10 described in the above embodiment may be mounted in a vehicle 20. In this case, the information processing apparatus 10 may perform information communication with the vehicle 20 directly, not via the network 40.

Although the above embodiment has been described in terms of a case where the information processing apparatus 10 predicts an amount of electricity demanded, based on at least past data of the amount of electricity demanded and schedules of a plurality of users, which have been stored in the storage section 12, the present disclosure is not limited to this case. The information processing apparatus 10 may acquire, for example, weather information from an external server connected to the network 40 outside the information processing system 1 and predict an amount of electricity demanded, also based on the acquired weather information.

Although the above embodiment has been described in terms of a case where the information processing apparatus 10 determines whether or not one user will refrain from use of a relevant vehicle 20 on the following day, based on the user's schedule for the following day, the present disclosure is not limited to this case. Instead of or in addition to the determination processing, the information processing apparatus 10 may determine whether or not one user will refrain from use of a vehicle 20 on the following day, based on input information relating to the user's transportation means for the following day. Consequently, the information processing apparatus 10 can execute such determination processing based on information in which the user's intension is directly reflected. Therefore, the information processing apparatus 10 enables further enhancement in determination accuracy of the determination processing.

For example, the information processing apparatus 10 may receive input information obtained from an input section 24 of one user's vehicle 20, from the vehicle 20 via the network 40 and the communication section 11, instead of or in addition to the processing in step S201 in FIG. 4. For example, the information processing apparatus 10 may receive input information obtained from an input section 33 of one user's terminal device 30, from the terminal device 30 via the network 40 and the communication section 11, instead of or in addition to the processing in step S201 in FIG. 4.

Although the above embodiment has been described in terms of a case where as information for making charging of one user's vehicle 20 wait in a predetermined time slot, the information processing apparatus 10 generates control information and notice information for the vehicle 20, the present disclosure is not limited to this case. The information processing apparatus 10 may generate only one of control information and notice information for the vehicle 20. In addition to or instead of these information pieces, the information processing apparatus 10 may generate control information for controlling an electricity grid to prevent the electricity grid from feeding electricity to the vehicle 20 in a predetermined time slot even if the vehicle 20 is connected to the electricity grid.

Although the above embodiment has been described in terms of a case where the information processing apparatus 10 transmits a content of an incentive to a vehicle 20 and a terminal device 30 as information, the present disclosure is not limited to this case. The information processing apparatus 10 may transmit a content of an incentive to one of a vehicle 20 and a terminal device 30 as information.

Although the above embodiment has been described in terms of a case where the information processing apparatus 10 acquires a user's schedule from the user's terminal device 30, the present disclosure is not limited to this case. The information processing apparatus 10 may acquire a user' schedule from an external server included in a cloud system to which the user's terminal device 30 is connected.

Although the above embodiment has been described in terms of a case where the information processing apparatus 10 changes a content of an incentive according to one user's transportation means for the following day, the present disclosure is not limited to this case. The information processing apparatus 10 may set a same content of an incentive irrespective of one user's transportation means for the following day.

Although the above embodiment has been described in terms of a case where the information processing apparatus 10 sets an incentive that is usable in a game related to transportation means, the present disclosure is not limited to this case. The information processing apparatus 10 may set an incentive that is usable in a game unrelated to transportation means or may set an incentive that is usable for a purpose other than a game.

Although the above embodiment has been described in terms of a case where the information processing apparatus 10 sets a game event related to transportation means, the present disclosure is not limited to this case. The information processing apparatus 10 may set a game event unrelated to transportation means or may omit such setting processing.

Although the above embodiment has been described in terms of a case where if the information processing apparatus 10 determines that a plurality of users have a strong tendency to use respective vehicles 20 on the following day, the information processing apparatus 10 increases an incentive, the present disclosure is not limited to this case. The information processing apparatus 10 may maintain a constant incentive irrespective of the degree of the tendency.

The information processing apparatus 10 may change a content of an incentive individually even though transportation means are the same. For example, where transportation means is a bus, the information processing apparatus 10 may increase an incentive more as a user uses an environmentally friendly bus that emits a smaller amount of $CO_2$.

What is claimed is:

1. An information processing apparatus, comprising:
a control section configured to
predict an amount of electricity demanded for charging of vehicles that a plurality of users use, respectively,
determine a time slot in which the amount of electricity demanded exceeds a threshold value,
determine whether or not one user of the plurality of users will refrain from use of a relevant vehicle of the vehicles on a following day, based on information relating to transportation means of the one user for the following day, and
in response to determining that the one user will refrain from the use of the relevant vehicle on the following day,
make charging of the relevant vehicle wait in the time slot,
transmit control information to control the relevant vehicle to prevent the relevant vehicle from being fed with electricity from an electricity grid in response to the relevant vehicle being connected to the electricity grid in the time slot, and
provide an incentive to the one user, wherein
the control section is further configured to
in response to determining that the one user will refrain from the use of the relevant vehicle on the following day, predict the transportation means for the following day based on a following-day schedule of the one user, and
set a game event related to the predicted transportation means.

2. The information processing apparatus according to claim 1, wherein
the control section is configured to determine whether or not the one user will refrain from the use of the relevant vehicle on the following day, based on the following-day schedule of the one user.

3. The information processing apparatus according to claim 1, wherein
the control section is configured to change a content of the incentive according to the transportation means of the one user for the following day.

4. The information processing apparatus according to claim 3, wherein
the control section is configured to set the incentive that is usable in a game related to the transportation means.

5. The information processing apparatus according to claim 1, wherein
the control section is configured to, in response to determining that the plurality of users have a strong tendency to use the respective vehicles on the following day, increase the incentive.

6. An information processing system, comprising:
the information processing apparatus according to claim 1;
the vehicles that the plurality of users use, respectively; and
terminal devices that the plurality of users use, respectively.

7. A non-transitory computer readable medium storing a program for causing, when executed by an information processing apparatus, the information processing device to execute:
predicting an amount of electricity demanded for charging of vehicles that a plurality of users use, respectively;
determining a time slot in which the amount of electricity demanded exceeds a threshold value;
determining whether or not one user of the plurality of users will refrain from use of a relevant vehicle of the vehicles on a following day, based on information relating to transportation means of the one user for the following day; and
in response to determining that the one user will refrain from the use of the relevant vehicle on the following day,
making charging of the relevant vehicle wait in the time slot,
transmitting control information to control the relevant vehicle to prevent the relevant vehicle from being fed with electricity from an electricity grid in response to the relevant vehicle being connected to the electricity grid in the time slot, and
providing an incentive to the one user, wherein
the program further causes the information processing device to execute
in response to determining that the one user will refrain from the use of the relevant vehicle on the following day, predicting the transportation means for the following day based on a following-day schedule of the one user, and
setting a game event related to the predicted transportation means.

8. The non-transitory computer readable medium storing the program according to claim 7, wherein
the program causes the information processing device to execute determining whether or not the one user will refrain from the use of the relevant vehicle on the following day, based on the following-day schedule of the one user.

9. The non-transitory computer readable medium storing the_program according to claim 7, wherein
the program causes the information processing device to execute changing a content of the incentive according to the transportation means of the one user for the following day.

10. The non-transitory computer readable medium storing the program according to claim 9, wherein
the program causes the information processing device to execute setting the incentive that is usable in a game related to the transportation means.

11. A vehicle, comprising:
a control section configured to
predict an amount of electricity demanded for charging of vehicles that a plurality of users use, respectively,
determine a time slot in which the amount of electricity demanded exceeds a threshold value,
determine whether or not one user of the plurality of users will refrain from use of a relevant vehicle of the vehicles on a following day, based on information relating to transportation means of the one user for the following day, and
in response to determining that the one user will refrain from the use of the relevant vehicle on the following day,
make charging of the relevant vehicle wait in the time slot,
transmit control information to control the relevant vehicle to prevent the relevant vehicle from being fed with electricity from an electricity grid in response to the relevant vehicle being connected to the electricity grid in the time slot, and
provide an incentive to the one user, wherein
the control section is further configured to in response to determining that the one user will refrain from the use of the relevant vehicle on the following day, predict the transportation means for the following day based on a following-day schedule of the one user, and set a game event related to the predicted transportation means.

12. The vehicle according to claim 11, wherein
the control section is configured to determine whether or not the one user will refrain from the use of the relevant vehicle on the following day, based on the following-day schedule of the one user.

13. The vehicle according to claim 11, wherein
the control section is configured to change a content of the incentive according to the transportation means of the one user for the following day.

14. The vehicle according to claim 13, wherein
the control section is configured to set the incentive that is usable in a game related to the transportation means.

15. The information processing apparatus according to claim 1, wherein
the control section is configured to,
in response to the predicted transportation means being walking, set the game event for the one user to walk through a predetermined area within a predetermined period of time, and
in response to the predicted transportation means being public transportation, set the game event for the one user to move to a predetermined spot.

16. The information processing apparatus according to claim 15, wherein
the public transportation includes a train, a bus, or a taxi, and
the predetermined spot includes a train station, a bus stop, or a taxi stand.

17. The non-transitory computer readable medium storing the program according to claim 7, wherein
the program causes the information processing device to execute
in response to the predicted transportation means being walking, setting the game event for the one user to walk through a predetermined area within a predetermined period of time, and
in response to the predicted transportation means being public transportation, setting the game event for the one user to move to a predetermined spot.

18. The non-transitory computer readable medium storing the program according to claim 17, wherein
the public transportation includes a train, a bus, or a taxi, and
the predetermined spot includes a train station, a bus stop, or a taxi stand.

19. The vehicle according to claim 11, wherein
the control section is configured to,
in response to the predicted transportation means being walking, set the game event for the one user to walk through a predetermined area within a predetermined period of time, and
in response to the predicted transportation means being public transportation, set the game event for the one user to move to a predetermined spot.

20. The vehicle according to claim 19, wherein
the public transportation includes a train, a bus, or a taxi, and
the predetermined spot includes a train station, a bus stop, or a taxi stand.

* * * * *